United States Patent
Holmes et al.

(10) Patent No.: US 12,177,518 B2
(45) Date of Patent: Dec. 24, 2024

(54) SYSTEMS AND METHODS FOR LIMITING INTERRUPTIONS TO USE OF AN APPLICATION ON THE BASIS OF WHICH APPLICATION IS REQUESTING TO CAUSE THE INTERRUPTION

(71) Applicant: Adeia Guides Inc., San Jose, CA (US)

(72) Inventors: Timothy Andrew Holmes, Eugene, OR (US); Michael McCarty, Agoura Hills, CA (US); Glen E. Roe, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 348 days.

(21) Appl. No.: 16/493,849

(22) PCT Filed: Mar. 15, 2017

(86) PCT No.: PCT/US2017/022595
§ 371 (c)(1),
(2) Date: Sep. 13, 2019

(87) PCT Pub. No.: WO2018/169529
PCT Pub. Date: Sep. 20, 2018

(65) Prior Publication Data
US 2021/0195288 A1  Jun. 24, 2021

(51) Int. Cl.
*H04N 21/442* (2011.01)
*H04N 21/433* (2011.01)
*H04N 21/45* (2011.01)

(52) U.S. Cl.
CPC ... *H04N 21/44218* (2013.01); *H04N 21/4333* (2013.01); *H04N 21/44224* (2020.08); *H04N 21/4532* (2013.01)

(58) Field of Classification Search
CPC ....... H04N 21/44218; H04N 21/44224; H04N 21/4333; H04N 21/4532
See application file for complete search history.

(56) References Cited

U.S. PATENT DOCUMENTS 6,239,794 B1   5/2001   Yuen et al.
6,564,378 B1   5/2003   Satterfield et al.
(Continued)

FOREIGN PATENT DOCUMENTS

WO   2016196999 A1   12/2016

OTHER PUBLICATIONS

"International Search Report and Written Opinion", International Search Report and Written Opinion of PCT/2017/022595 dated Feb. 26, 2018.

(Continued)

*Primary Examiner* — Randy A Flynn
(74) *Attorney, Agent, or Firm* — Haley Guiliano LLP

(57) ABSTRACT

Systems and methods are provided herein for determining whether to authorize output of a first application to be interrupted by output of a second application. The media guidance application may provide output of a first application to a user and receive, from a second application, a request to provide second output from the second application to the user. In response to receiving the request, the media guidance application may determine whether the user is involved in physical activity and, in response to determining that the user is involved in physical activity, retrieve from a database information in a profile corresponding to the user. If the information indicates that the physical activity is routine, the media guidance application may deny the request and continue to provide the first output of the first application to the user.

20 Claims, 6 Drawing Sheets

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,451,584 B1* | 9/2016 | Cosenza | H04W 68/005 |
| 9,678,637 B1* | 6/2017 | Brothers | H04N 21/8106 |
| 2002/0174430 A1 | 11/2002 | Ellis et al. | |
| 2005/0251827 A1 | 11/2005 | Ellis et al. | |
| 2009/0319288 A1* | 12/2009 | Slaney | G06Q 10/10 |
| | | | 705/1.1 |
| 2010/0153885 A1 | 6/2010 | Yates | |
| 2010/0173677 A1* | 7/2010 | Fu | H04N 21/41407 |
| | | | 715/702 |
| 2015/0264292 A1* | 9/2015 | Greene | H04N 21/472 |
| | | | 386/248 |
| 2015/0317465 A1* | 11/2015 | McCarty | G06F 16/2365 |
| | | | 726/19 |
| 2016/0147411 A1* | 5/2016 | Li | G06F 3/017 |
| | | | 715/846 |
| 2017/0032248 A1* | 2/2017 | Dotan-Cohen | H04L 67/52 |

OTHER PUBLICATIONS

"IPRP", International Preliminary Report of Patentability of PCT/2017/022595 dated May 2, 2019.

* cited by examiner

SYSTEMS AND METHODS FOR LIMITING INTERRUPTIONS TO USE OF AN APPLICATION ON THE BASIS OF WHICH APPLICATION IS REQUESTING TO CAUSE THE INTERRUPTION

CROSS-REFERENCE TO RELATED APPLICATIONS

This application is a national stage application under 35 U.S.C. § 371 of International Application PCT/US2017/022595, filed Mar. 15, 2017, the disclosure of which is hereby incorporated by reference herein in its entirety.

BACKGROUND

Applications that output media (e.g., video applications, music applications, etc.) are ubiquitously used while users are engaged in physical activity. For example, users often enjoy listening to a playlist from a music application when going for a jog, or viewing video from a video streaming application when jogging on a treadmill. When another application interrupts the user's enjoyment of the output media (e.g., a text message notification interrupts the user's enjoyment of a song), a user may become frustrated. The related art does not address limiting interruptions to a user's enjoyment of media while the user is engaged in a physical activity.

SUMMARY

Systems and methods are provided herein for determining whether to authorize output of a first application to be interrupted by output of a second application when a user is engaged in routine physical activity. For example, if a user routinely jogs from 9:00 am to 10:00 am, and is using a music application to listen to music while jogging, the user might find it disruptive if the music is interrupted by output of a second application (e.g., an email or text message notification). Thus, the systems and methods provided herein may ensure that the interruption is only performed if the output of the second application is sufficiently important.

To this end and others, in some aspects of the disclosure, a media guidance application provides first output of a first application for consumption by a user. For example, the media guidance application provides output by a audio application (e.g., the music streaming application Spotify) for consumption by the user. The media guidance application may receive, from a second application (e.g., an application that provides SMS messaging (text messaging) to users), a request to provide second output from the second application to the user (e.g., a request to output an audio notification that a text message was received).

In some embodiments, in response to receiving the request, the media guidance application may activate a sensor to determine whether the user is involved in physical activity. For example, the media guidance application may activate a heart rate sensor to determine whether the user has an unusually high heart rate, which is indicative of the user being involved in physical activity. The media guidance application may detect, using the activated sensor, that the user is involved in physical activity.

In some embodiments, in response to determining that the user is involved in physical activity, the media guidance application may retrieve from a database information in a profile corresponding to the user. The media guidance application may determine whether the information indicates that the physical activity is routine. For example, the media guidance application may log, in the profile, when the user is engaged in physical activity. The media guidance application may determine that the physical activity is routine if the user performs the physical activity on a periodic basis.

In some embodiments, in response to determining that the physical activity is routine, the media guidance application may deny the request, and may continue to provide the first output of the first application to the user. For example, the media guidance application may cause the SMS notification to be unable to be output to the user to avoid interruption of the user's playback of a song.

In some embodiments, in response to determining that the physical activity is not routine, the media guidance application may authorize the request by the second application. The media guidance application may pause the first output of the first application to the user (e.g., pause the song), and may provide the second output of the second application (e.g., the audio SMS notification). The media guidance application may receive a command from the user to cease generating the second output of the second application (e.g., the user views the SMS message, or squelches the audio notification). In response to receiving the command, the media guidance application may automatically resume the first output of the first application (e.g., resume playback of the song or move on to a next song in a playlist).

In some embodiments, in response to determining that the physical activity is not routine, the media guidance application may prompt the user to input whether the user prefers to continue consuming the first output of the first application, or to switch to consuming the second output of the second application.

For example, the user may be prompted with a notification that says "Incoming telephone call from John Smith—switch to call? YES/NO". In response to receiving input from the user that the user prefers to switch to consuming the second output of the second application (e.g., selection of the "YES" option), the media guidance application may end the generating of the first output of the first application, and may provide the second output of the second application to the user. In response to receiving input from the user that the user prefers to continue consuming the first output of the first application (e.g., selection of the "NO" option), the media guidance application may deny the request.

In some embodiments, further in response to determining that the physical activity is routine, the media guidance application may determine from the information (e.g., the retrieved profile information) whether the user routinely uses the first application while the user is engaged in the physical activity. For example, the media guidance application may monitor the use of a music application while the user is engaged in jogging, and may determine whether the user uses the music application a threshold number of times that the user goes jogging. In response to determining that the user routinely uses the first application while the user is engaged in the physical activity, the media guidance application may deny the request. This may be because the user consistently uses the music application while jogging, and thus is more likely to feel a loss of enjoyment when that consistent use is interrupted. On the other hand, in response to determining that the user does not routinely use the first application while the user is engaged in the physical activity, the media guidance application may authorize the request and allow the interruption by the second application to occur.

In some embodiments, when the media guidance application is denying the request, and continues to provide the first output of the first application to the user, the media guidance application may determine, from the information, a level of preference of the user for the first application and a level of preference of the user for the second application (e.g., preference may be determined based on how frequently each application is used). The media guidance application may compare the level of preference of the user for the first application to the level of preference of the user for the second application, and may determine whether the level of preference of the user for the first application exceeds the level of preference of the user for the second application.

In response to determining that the level of preference of the user for the first application exceeds the level of preference of the user for the second application, the media guidance application may deny the request, and may continue to provide the first output of the first application to the user. In response to determining that the level of preference of the user for the first application does not exceed the level of preference of the user for the second application, the media guidance application may refrain from denying the request, end the generating of the first output of the first application, and may provide the second output of the second application to the user.

In some embodiments, when the media guidance application is denying the request, and continuing to provide the first output of the first application to the user, the media guidance application may determine a level of preference of the user for the physical activity, and may determine a level of preference of the user for the second output of the second application. For example, the media guidance application may determine that the user profile indicates the user loves running and dislikes talking on the phone. The media guidance application may compare the level of preference of the user for the physical activity to the level of preference of the user for the second output of the second application, and may determine whether the level of preference of the user for the physical activity exceeds the level of preference of the user for the second output of the second application.

In response to determining that the level of preference of the user for the physical activity exceeds the level of preference of the user for the second output of the second application, the media guidance application may deny the request, and continue to provide the first output of the first application to the user. In response to determining that the level of preference of the user for the physical activity does not exceed the level of preference of the user for the second output of the second application, the media guidance application may refrain from denying the request, may end the generating of the first output of the first application, and may provide the second output of the second application to the user.

In some embodiments, the media guidance application, further in response to determining that the physical activity is routine, may monitor, using the sensor, for a break in the physical activity (e.g., the user pauses the jog to take a break). The media guidance application may detect, during the monitoring, the break in the physical activity (e.g., a GPS sensor indicates that the user is no longer moving). In response to detecting the break in the physical activity, the media guidance application may pause the first output of the first application to the user and may provide the second output of the second application.

In some embodiments, the media guidance application may monitor, using the sensor, for an end to the break in the physical activity. The media guidance application may detect, during the monitoring for the end to the break in the physical activity, that the user has resumed performance of the physical activity (e.g., the GPS again indicates movement). In response to detecting that the user has resumed performance of the physical activity, the media guidance application may discontinue the generating of the second output of the second application (e.g., end a phone call or close a text message), and may resume the generating of the first output of the first application (e.g., resume playback of the song).

In some embodiments, the media guidance application, further in response to determining that the physical activity is routine, may determine, from the information, a plurality of additional users with whom the user is connected (e.g., friends on a social media platform like Facebook). The media guidance application may retrieve, from a social media database, information about each of the additional users (e.g., the user's preferences). The media guidance application may determine, based on the information about each of the additional users, that an additional user also routinely performs the physical activity. In response to determining that the additional user also routinely performs the physical activity, the media guidance application may notify the user that the additional user shares an interest in the physical activity.

In some embodiments, the media guidance application may determine attributes of the physical activity (e.g., jogging), and may determine attributes of the first output (e.g., music). The media guidance application may query the database for entries comprising both the attributes of the physical activity and the attributes of the first output, and may retrieve, based on the querying, an entry of the entries comprising both the attributes of the physical activity and the attributes of the first output. For example, the entry may indicate a playlist of music that is well suited for jogging. The media guidance application may prompt the user with information relating to the entry (e.g., that the playlist be used to consume music using the music application).

DETAILED DESCRIPTION

Figure 1:
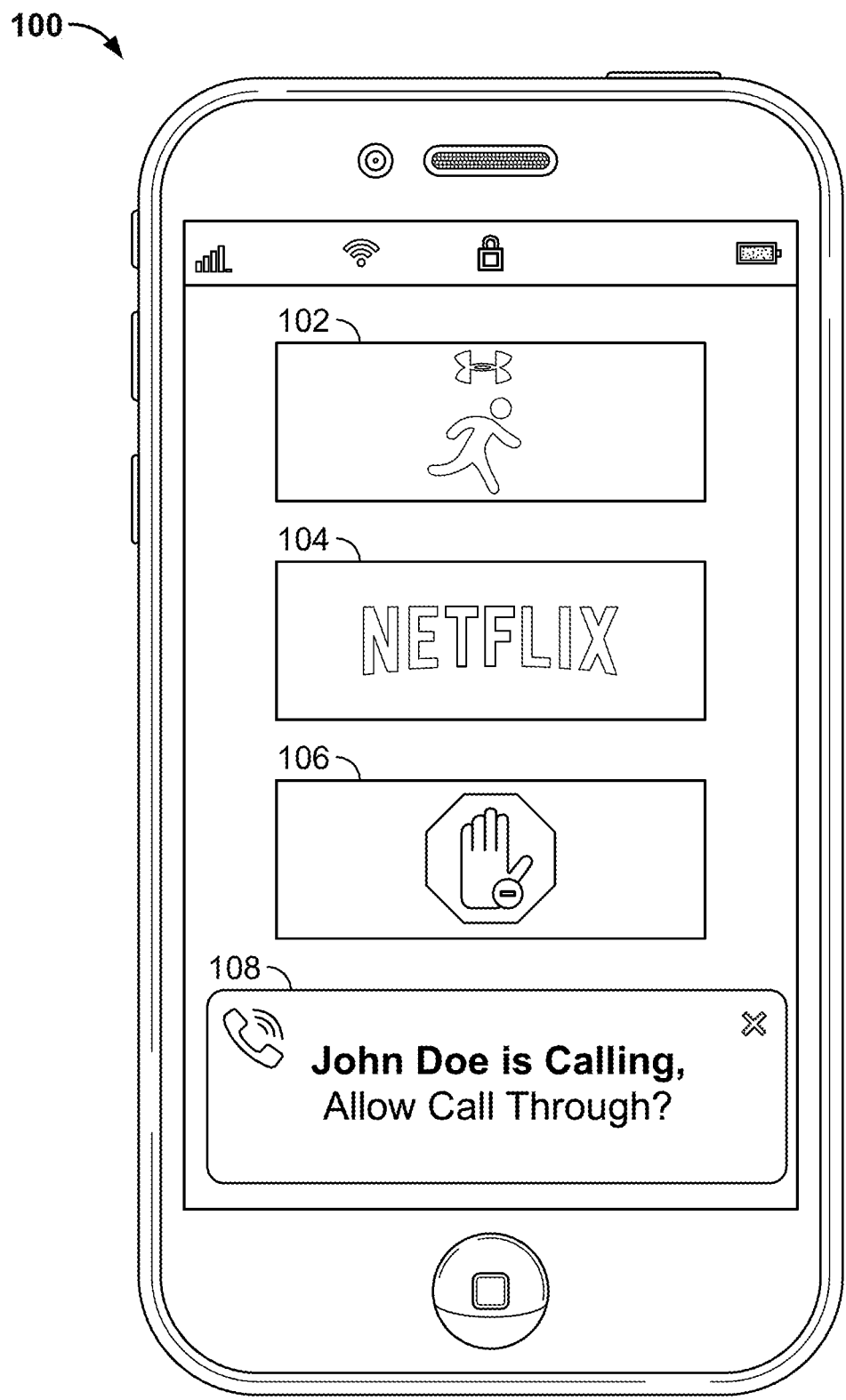
FIG. 1 depicts an illustrative embodiment of a display screen of user equipment that is running various applications, in accordance with some embodiments of the disclosure.

FIG. 1 depicts an illustrative embodiment of a display screen of user equipment that is running various applications, in accordance with some embodiments of the disclosure. FIG. 1 depicts user equipment 100, which is running one or more applications. For example, application 102 may be an application associated with physical activity (e.g., an application that a user uses to monitor his progress when running). Application 104 may be an application associated with media consumption, such as a video streaming application or an audio streaming application.

Application 106 may be an application that may request to cause the media guidance application to interrupt the output of application 104 with output of application 106. Prompt 108 may be any type of prompt. Prompt 108 may prompt a user as to whether the user wishes to allow an interruption to an output of media by application 104, such as an interruption sent from application 106. All elements of FIG. 1 are merely illustrative, and are all optional.

In some embodiments, the media guidance application provides first output from application 104 for consumption by a user. Application 104 is an application that outputs media. The media may be of any form (e.g., audio, video, text, etc.). For example, the media guidance application provides output of an audio application (e.g., the music streaming application Spotify) for consumption by the user. As another example, the media guidance application provides output of a video application (e.g., the video streaming application Netflix) for consumption by the user. Various media that may be provided is described in further detail below with reference to FIGS. 2-5.

While providing output from application 104, the media guidance application may receive, from application 106 (e.g., an application that provides SMS messaging (text messaging) to users), a request to provide second output from application 106 to the user (e.g., a request to output an audio notification that a text message was received). Because the media guidance application is providing output from application 104, the media guidance application may determine that approving the request from application 106 to provide the second output would form an interruption to the output from application 104. The media guidance application may determine, based on the methods described below, if the interruption to the output from application 104 should be allowed or denied.

Allowance of an interruption to output from application from 104 by application 106 may take many forms, and may be a partial interruption or a complete interruption. The term "interruption" and its variants as used herein is defined as any impediment to the user's ability to completely consume the media output by application 104. For example, if the media is video, even a small overlay on top of the video would cause a partial interruption. If the media is audio (e.g., music), even a small tonal interruption would cause a partial interruption. A complete interruption would be a total obfuscation of the output of application 104 in favor of the output of application 106. Various forms of partial and complete interruptions are described in further detail below.

One form of interruption that the media guidance application may output from application 106 is a push notification. Alternatively, the media guidance application may generate its own push notification that relates to the output from application 106 (e.g., if the output from application 106 is an email, the media guidance application may generate its own notification that an email was received by application 106). A push notification may be a visual, audio, haptic, or other sensory message notification that alerts the user to an event without user input to cause the notification. As depicted in FIG. 1, the media guidance application may provide output for a push notification using prompt 108. While prompt 108 is depicted as an image, prompt 108 may take any form, such as audio played through user equipment 100's speakers 414, which can be seen below in FIG. 4, or a combination of both. If prompt 108 is a push notification that is a written message, the media guidance application may display prompt 108 over the output of application 104 (e.g., forming a partial interruption). The media guidance application may provide prompt 108 with means for opening the application that sent the push notification. For instance, the media guidance application may generate "YES/NO" options associated with prompt 108. If the media guidance application detects a user selecting the "YES" option, the media guidance application may redirect the user to a platform associated with application 106 (e.g., by launching application 106 on user equipment 100). Likewise, if the media guidance application detects the user selecting the "NO" option, the media guidance application may close the push notification prompt and resume providing application 104's output in full, by removing prompt 108 from the user's sensory field.

In embodiments where the output from application 104 includes video (e.g., where application 104 is a video streaming service such as Netflix), the media guidance application may receive a request from application 106 (e.g., where application 106 is a social media application such as Facebook) to output media, which may cause an interruption to the output of application 104. The interruption may take the form of a push notification, and/or may take the form output of the actual media, in part or in its entirety. The media guidance application may provide output for the push notification using prompt 108, which may say, "John Doe commented on your status." The media guidance application may provide prompt 108 with means for opening the application that sent the push notification. For instance, the media guidance application may make prompt 108 to be selectable. If the media guidance application detects a user selecting prompt 108, the media guidance application may redirect the user into application 106 (e.g., forming a complete interruption). If the media guidance application does not detect a user selecting the prompt after a set amount of time (e.g., three seconds), the media guidance application may close the prompt from the user's sensory field and continue providing the output of application 104. The media guidance application may determine that the set amount of time may vary for different types of notifications, and may be a default amount associated with given ones, or types of, possible applications that may be used as application 106 (e.g., set amount of time for SMS messaging applications may be three seconds and set amount of time for email applications may be 10 seconds).

In embodiments where the output of application 104 is audio (e.g., application 104 is the music streaming application Spotify), the media guidance application may receive a request from application 106 to output media (e.g., an application that outputs news articles or highlights), which may interrupt the output of application 104. The media guidance application may generate an interruption in the form of a push notification (e.g., prompt 108, followed with a small tonal interruption). The media guidance application may generate prompt 108 with a message that may say "BREAKING NEWS—HBO renews hit show, GAME OF THRONES; Read rest of story? 'YES' or 'NO'" (e.g., a partial interruption). The media guidance application may provide prompt 108 with means to open application 106. The media guidance application may generate two selectable options, a "YES" option and a "NO" option. If the media guidance application detects the user selecting the "YES" option, the media guidance application may redirect the user to the full article in application 106 (e.g., a complete interruption). On the other hand, if the media guidance application detects the user selecting the "NO" option, the media guidance application may close prompt 108, stop the tonal interruption, and resume providing playback of audio from application 104.

Another form of interruption that the media guidance application may output is the forced output of media from application 106. The media application may receive a request from application 106 to output media, which may cause an interruption in the output of application 104. One way the media guidance application may handle a forced output of media interruption is as follows: the media guidance application may stop providing the output of application 104 and start providing the output of application 106 immediately after. Another way the media guidance application may handle a forced output of media interruption is as follows: the media guidance application may continue to provide output from application 104, and may start providing the output of application 106 over the output of application 104. For example, the media guidance application may provide output (e.g., an SMS text message) from application 106 over the output of application 104 (e.g., a video), which the media guidance application may continue to output in the background (e.g., the user may hear the audio from the video, but the video is completely obscured by the SMS text message).

For example, the media guidance application may receive a request to output media from application 106 (e.g., a voice calling application, or video-chat calling application, such as Skype), which may cause an interruption in the media output from application 104 (e.g., a music application, such as Spotify). The media guidance application may allow the request, and may stop providing output from application 104. The media guidance application may then output the media from application 106, which may be a ring tone that indicates an incoming call (e.g., a complete interruption).

In some embodiments, in response to receiving the request, the media guidance application may activate a sensor to determine whether the user is involved in physical activity. As used herein, the term "sensor" is defined to mean a device that measures a physical property. As an example, the media guidance application may use various biometric sensors to measure various attributes (described in further detail below) that would indicate that the user is involved in physical activity. The media guidance application may also use non-biometric sensors to measure various types of data (as described in further detail below) that would indicate that the user is involved in physical activity (e.g., GPS (Global Positioning System) sensors, location sensors based on cell towers, or any similar type of sensor). Sensors may be built into user equipment 100, or may be external devices that communicate with user equipment 100 by way of communications network 514, as discussed below and seen in FIG. 5. The media guidance application may send a command, either locally or over communications network 514, to activate a sensor. After a sensor is activated, the media guidance application may command the sensor to gather measurements. The media guidance application may store the measurements as information in a user profile. The user profile may be stored in a database, as described below. The media guidance application may access the user profile in the database to retrieve the sensor measurements. The media guidance application may then determine if the measured attributes indicate that the user is involved in physical activity. The media guidance application may use algorithms, comparisons of the measured attributes values with known attribute values for physical activity, comparisons of the measured attributes with known user-defined attribute values for physical activity, or any other known method for determining that the user is involved in physical activity.

An example of the media guidance application activating a biometric sensor is when the media guidance application may send a command to activate a heart rate sensor to determine whether the user has a heart rate that is within range of the user's exercising heart rate. The user's exercising heart rate is information that may be stored in the user profile of the database, and is indicative of the user being involved in physical activity. For instance, the user's exercising heart rate range may be between 50% to 90% of the user's maximum heart rate. The media guidance application may store the heart rate sensor's measurements in the user profile in the database. The media guidance application may retrieve the heart rate sensor's stored measurements from the user profile in the database, and compare these measurements with the user's exercising heart rate range. If the measurements fall within this range, then the media guidance application may determine that the user is involved in physical activity.

As another example of the media guidance application activating a biometric sensor, the media guidance application may send a command to activate a camera sensor to determine whether the user is involved in physical activity. For instance, the camera may be in the user's living room, and the media guidance application may upload the video data to the user profile in the database. The media guidance application may then retrieve the video data, and may determine if the video data shows that the user is moving in each video frame, or over a range of video frames. If the media guidance application determines that the user is moving in the video frames, the media guidance application may determine that the movement is indicative of the user being involved in physical activity. A camera sensor may be used to track a user doing yoga or Pilates in the user's home or similar area, or any other similar exercise activity.

As yet another example of the media guidance application activating a biometric sensor, the media guidance application may send a command to activate an accelerometer sensor to determine at what speed the user is moving. The media guidance application may store the accelerometer measurements in the user profile in the database. The media guidance application may store as the accelerometer's measurements the user's speed at a certain timestamp. The media guidance application may retrieve the accelerometer measurements from the user profile, and then compare the user's speed to a user-defined speed range that is indicative of physical activity. The user-defined speed range is information found in the user's profile in the database. For instance, the media guidance application may determine from the information that the user-defined speed range may be anything higher than four miles per hour. The media guidance application may determine that the user is involved in physical activity if the user's speed is within the user-defined speed range that is indicative of physical activity.

An example of the media guidance application activating a non-biometric sensor is when the media guidance application may send a command to activate a sensor that tracks the user's movements through GPS (Global Positioning System). The media guidance application may store the GPS measurements in the user profile in the database. The media guidance application may store as the GPS's measurements the user's physical location at a certain timestamp. The media guidance application may retrieve the GPS measurements from the user profile, and then calculate the user's speed from multiple measurements. For instance, the media guidance application may determine the user's speed from two GPS measurements by finding the distance between the two points and then dividing that distance by the time between the two points. The media guidance application may determine if the calculated speed is indicative of physical activity by comparing the calculated speed to the user-defined speed range, as described above.

As another example of the media guidance application activating a non-biometric sensor, the media guidance application may send a command to activate a sensor that tracks the user's movements through cell tower location tracking. The media guidance application may store the user's location relative to multiple cell tower locations in the user profile in the database. The media guidance application may determine the location of the user based on the user's location relative to multiple cell tower locations (e.g., through triangulation). The media guidance application may store as the cell tower location tracking measurements the user's physical location at a certain timestamp. The media guidance application may retrieve the cell tower location tracking measurements from the user profile, and then calculate the user's speed from multiple measurements. For instance, the media guidance application may determine the user's speed from two cell tower location tracking measurements by finding the distance between the two points and then dividing the distance by the time between the two points. The media guidance application may determine if the calculated speed is indicative of physical activity by comparing the calculated speed to the user-defined speed range, as described above.

In some embodiments, in response to determining that the user is involved in physical activity, the media guidance application may retrieve from a database information in a profile corresponding to the user. The media guidance application may determine whether the information indicates that the physical activity is routine.

The term "routine" and its variants as used herein is defined as physical activity that fits into a media guidance application-determined pattern of physical activity by the user (described in more detail below). For example, the media guidance application may determine a pattern, using the embodiments described below, of the user going for a jog four or five times each week. The media guidance application may determine that the user going for a jog on a Monday morning is routine physical activity because it fits into the user's jogging pattern. As another example, the media guidance application may determine that the user is going surfing on a whim (e.g., the user has never surfed before). The media guidance application may determine that the user's surfing session is not routine because the surf session does not fit into any of the user's physical activity patterns.

The media guidance application may log, e.g., in the user profile, when the user is engaged in physical activity. The media guidance application may log, as a single data point, any instance of physical activity (e.g., as detected by a sensor). The media guidance application may use different criteria to determine if the logged data points are indicative of routine physical activity.

In some embodiments, the media guidance application may log instances of physical activity by importing the user's calendar to the user profile. The media guidance application may determine, on a calendar entry-by-entry basis, any entries that are indicative of physical activity. For instance, the media guidance application may determine, from a calendar entry that states "Run with Joe; 8:00 am-8:30 am; Repeating every Monday" that the user engages in physical activity every Monday morning. The media guidance application may log a data point in the user profile for every Monday morning run as detected by a sensor.

In some embodiments, the media guidance application may log instances of physical activity based on the user's electronic communications (e.g., the communications may be from emails, SMS text messages, Facebook Messenger messages, WhatsApp messages, or similar correspondences). The media guidance application may determine, by searching through the electronic communications, messages that are indicative of the user engaging in physical activity. If the media guidance application determines that a message is indicative of physical activity, it may log a data point in the user profile. For example, the media guidance application may find a text message that the user sent to a friend that states "Wow, that was a great workout!". The media guidance application may determine from the content of this message that the user completed a workout, and log the workout as a data point in the user profile. The media guidance application may implement this log even in the absence of a sensor measurement indicative of physical activity. On the other hand, the media guidance may find an email from the user to a friend that states "I do not feel like working out today." The media guidance may determine from the content of this message that the user did not complete a workout, and not log the workout as a data point in the user profile.

In some embodiments, the media guidance application may log instances of physical activity based on measurements from a sensor. The media guidance application may use sensor measurements to determine if the user is engaged in physical activity, and if so, the media guidance application may determine if the physical activity warrants a data point being logged in the user profile. The media guidance application may make this determination by determining if the user's physical activity meets certain criteria. For example, the media guidance application may log a data point in the user profile if the sensor data indicates that the user has been engaged in physical activity for longer than a certain time threshold (e.g., the user's heart rate must be within the user's exercising heart rate range for at least 20 minutes). The media guidance application may vary the time threshold about what qualifies as physical activity based on the type of sensor, the intensity of the physical exercise, and any other similar qualities. As another example, the media guidance application may log a data point in the user profile if the sensor data indicates that the user has reached a certain intensity in the user's workout (e.g., the user's heart rate has reached 85% of the user's maximum heart rate).

The media guidance application may determine that the physical activity is routine using different criteria. The media guidance application may determine that every reoccurring calendar entry indicative of physical activity (as described above) in the user profile is routine. The media guidance application may make this determination by finding that reoccurring entries constitute a pattern of physical activity. The media guidance application may also determine that the physical activity is routine if the user performs the physical activity on a regular basis. The media guidance application may determine that the user is engaging in physical activity on a regular basis by analyzing the data points logged in the user profile. The media guidance application may sort the data points into different patterns (e.g., examples of patterns may be workouts on Mondays, days where the user goes on jogs, number of yoga practices completed per week, or other similar patterns). The media guidance application may then determine, based on the different patterns, whether the physical activity currently in question fits into one of the patterns. If the media guidance application determines that, yes, the physical activity fits in one of the patterns, then the physical activity is routine. If the media guidance application determines that, no, the physical activity does not fit in one of the patterns, then the physical activity is not routine.

For example, the media guidance may determine, using sensor measurements, that the user has gone on a one-hour run on a Saturday morning.

The media guidance application may then sort the currently logged data points into different patterns. The media guidance application may determine that one of the sorted patterns is the "average number of runs the user takes per week" (e.g., average number of runs is four). The media guidance application may determine from the log that the user has taken two runs that week already. With this information, the media guidance application may determine that the user's Saturday morning run will be the user's third run of the week, and that the Saturday run fits into the "average number of runs the user takes per week" pattern. Thus, the media guidance application may determine that the Saturday run is routine physical activity. On the other hand, the media guidance application may determine that the Saturday run does not fit into any of the generated patterns, and thus may determine that the Saturday run is not routine physical activity.

The media guidance application may retrieve information from a database stored remotely on a server. The media guidance application may also retrieve information from a database stored on a local drive, or any combination of a database that is stored both locally and remotely. Retrieval of information from a database is described below with respect to FIGS. 2-5, and applies equally here.

In some embodiments, in response to determining that the physical activity is routine, the media guidance application may deny the request by application 106 to output media, and may continue to provide the output of application 104 to the user. Denial of a request may be partial (e.g., a request is delayed, or output of media from application 106 is allowed to partially interrupt the output from application 104), or may be complete (e.g., the output from application 106 is entirely blocked from reaching the user).

In some embodiments, the media guidance application may deny the request by delaying the request. In this method for denying a request, the media guidance application delays the request until the user takes a break from the physical activity. A break is defined in more detail in later paragraphs. In some embodiments, the media guidance application provides output from application 104 to the user. When the media guidance application receives a request to output media by application 106, which may result in an interruption of application 104's output, the media guidance application places the requested interruption on hold (e.g., in a queue). When the user takes a break, the media guidance application recognizes that a break is happening, as described below, and the media guidance application lifts the hold on the requested interruption and provides output for application 106's media.

For example, the media guidance application may provide audio as the output of application 104 (e.g., application 104 is a music application). If the user is on a jog, and application 106 (e.g., an SMS messaging application) requests to output its media and interrupt the audio playback, the media guidance application may put this requested interruption on hold. When the user takes a break from jogging, the media guidance application may recognize the break, as described below, and provide output for application 106's media, which may be a push notification. The media guidance application may then provide output for the push notification, which may be displayed as prompt 108 on user equipment 100. The media guidance application may generate prompt 108 that may display the text of the SMS message (e.g., "From Jen: Do you want to hang out this weekend?"). The media guidance application may have also generated prompt 108 to vibrate user equipment 100 (e.g., by commanding an internal motor inside user equipment 100 to turn on), or may have generated prompt 108 to be a tonal notification.

Another such way that the media guidance application may deny the request is by outputting something that is not disruptive to the user. In this embodiment, the media guidance application provides output from a first application, such as application 104, to the user. When the media guidance application receives a request from application 106 to output media, which may interrupt the output of application 104, the media guidance application outputs a modified version of the requested interruption to the user. The media guidance application may determine what modified version of the requested interruption to output through the use of a lookup table, found in the information in the user profile, that tracks which types of notifications interfere the least with which types of outputs. The modified version of the requested interruption may take many forms that will be described below.

In some embodiments, the media guidance application may output a short tonal notification as the modified version of the requested interrupt when the output from application 104 is visual. The media guidance application may determine to output as the modified version of the requested interrupt an output that provides the least amount of interference to the output of application 104. For example, if the output of application 104 is a page of text (e.g, a news article), and the original output of application 106 is prompt 108 that displays a written message (e.g., the text of an SMS message), the media guidance application may decide, after using the lookup table, to output a short tonal notification in place of prompt 108 (e.g., prompt 108 says "New message from John") that alerts the user to the presence of an SMS message. The media guidance application may determine to output the tonal notification in the place of prompt 108 by determining from the lookup table that a tonal notification will not interfere with a visual output from application 104.

In some embodiments, the media guidance application may output a visual notification as the modified version of the requested interrupt when the output from application 104 is audio. For example, if the output of application 104 is playback of a song, and the original output of application 106 is a tonal notification, the media guidance application instead may output prompt 108 that says "New SMS message from Katie" in the place of the tonal notification to alert the user to the presence of an SMS message, without interfering with the user's ability to hear the audio output from application 104. The media guidance application may make the determination to output prompt 108 with text in the place of a tonal notification by determining from the lookup table that a text-based notification will not interfere with an audio output from application 104.

In some embodiments, when the output from application 104 is both visual and audio, the media guidance application may output a small, out-of-the-way prompt 108 as the modified version of the requested interrupt. The media guidance application may limit any text in prompt 108 to a small enough amount so that will interfere with the output of application 104 in a very limited capacity. The media guidance application may also output a small image (e.g., an application's logo) in lieu of text, in the case where outputting a small image over the output of application 104 would be less obtrusive than a message with text. For example, if the output of application 104 is a video (e.g., a movie streaming from Nefflix), and the original output of application 106 is a tonal notification, the media guidance application may output prompt 108 as a small box in the upper right corner of the display that shows the logo of application 106 after determining that this prompt would be the least obtrusive notification (e.g., by using the lookup table). Further embodiments for determining an optimal location for an overlay that would minimize obstruction to an important item being displayed are described in greater detail in Gupta et al. P.C.T. Application No. PCT/US2016/066281, filed Dec. 13, 2016, the disclosure of which is hereby incorporated by reference herein in its entirety.

Yet another such way that the media guidance application may deny the request is by outright denying the request. In this embodiment, the media guidance application provides output from application 104 to the user. When the media guidance application receives a request from application 106 to output media, which may interrupt the output of application 104, the media guidance application may deny the request and never output application 106's requested output to user equipment 100.

The media guidance application may determine whether to either partially deny or delay the request or outright deny the request using different criteria. For example, the media guidance application may determine to outright deny the request based on the user's level of preference, which is described in detail below, for application 106 (e.g., application 106 has a preference lower than a threshold level needed to partially deny/delay the request). The media guidance application may use a user-defined threshold level found in the information in the user profile. On the other hand, the media guidance application may determine to partially deny or delay the request if application 106 has a high level of preference (e.g., higher than the threshold level).

For example, if application 104 is outputting audio, and the media guidance application receives a request from application 106 to output media (e.g., a ring tone), the media guidance application may outright deny the request. The media guidance application may determine to outright deny the request by determining the user's level of preference for application 106, as described in embodiments found below. The media guidance may determine that application 106's level of preference is below the threshold level needed to warrant the media guidance application partially denying or delaying the request, and thus may outright deny the request.

In some embodiments, in response to determining that the physical activity is not routine, the media guidance application may authorize the request by the second application. The media guidance application may determine that the physical activity is not routine using the same methods for determining if physical activity is routine, as described above. For example, the media guidance application may retrieve the logged data points in the user profile, and sort the data points into different patterns, as described above. The media guidance application may determine that the physical activity in question does not fit into any of these patterns, and thus the media guidance application may determine that the physical activity is not routine.

For example, the media guidance application may retrieve the logged data points from the user profile and sort the data points into patterns, as described above. If the user has to run to work because the user's car broke down, the media guidance application may determine that the user is engaged in physical activity based on sensor measurements (e.g., the user's heart rate is within the user's exercising heart rate range). The media guidance application may then determine that the user's run is not routine by determining that the run does not fit into any of the data-point-generated patterns. For instance, the patterns may be, "workouts between 8:00 pm-10:00 μm" and "3-6 yoga classes per week." The media guidance application may find that the run does not fit into any of the patterns, and thus is not routine.

In some embodiments, in response to determining that the physical activity is not routine, the media guidance application may authorize the request by the application 106 to output media. The media guidance application may pause the output of application 104 (e.g., pause the song), and may provide the output of application 106 (e.g., an audio SMS notification) during the pause in output of application 104. Following the provision of the output of application 106, the media guidance application may receive a command from the user to cease generating the output of application 106. For example, the command from the user may be viewing the SMS message, squelching the audio notification by turning off speakers 414, opening and leaving open the email message for a threshold amount of time (e.g., 10 seconds), or any other similar command. In response to receiving the command, the media guidance application may automatically resume the output of application 104 (e.g., resume playback of the song or move on to a next song in a playlist).

For example, if application 104 is outputting audio (e.g., application 104 is a music application), the media guidance application may allow application 106's (e.g., a voice call application) request to output media, interrupting the output of application 104. The media guidance application may pause the output of application 104 and alert the user of an incoming phone call with an audio notification. In response to the user commanding the media guidance application to ignore the call (e.g., selecting the ignore button on the display), the media guidance application may automatically resume playback of application 104's audio output. On the other hand, if the user answers the call, the media guidance application may resume playback of the audio after the user commands the media guidance application to end the call (e.g., selecting the hang-up button on the display).

In some embodiments, in response to determining that the physical activity is not routine, the media guidance application may prompt the user to input whether the user prefers to continue consuming the output of application 104, or to switch to consuming the output of application 106. For example, the media guidance application may generate and output prompt 108 that says "Incoming telephone call from John Smith—switch to call? YES/NO." The media guidance application may generate two selectable options, a "YES"

option and a "NO" option. In response to receiving input from the user that the user prefers to switch to consuming the output of application 106 (e.g., selection of a "YES" option), the media guidance application may stop providing the output of the application 104, and may provide the output of application 106 to the user. In response to receiving input from the user that the user prefers to continue consuming the output of application 104 (e.g., selection of the "NO" option), the media guidance application may deny application 106's request for interruption. The media guidance application may deny the request as described above.

For example, in response to determining that the physical activity is not routine, the media guidance application may generate and output prompt 108 that says "New SMS message from John Smith—read message? YES/NO." The media guidance application may generate two selectable options, a "YES" option and a "NO" option. In response to receiving input of "YES" from the user, the media guidance application may end the output of the user's application 104 (e.g., a video stream from the Netflix application) and open application 106 (e.g., an SMS messaging application). In response to receiving input of "NO" from the user, the media guidance application may continue the output of application 104, and deny the request to output media from application 106.

In some embodiments, further in response to determining that the physical activity is routine, the media guidance application may determine, from the information (e.g., the retrieved profile information), whether the user routinely uses the first application while the user is engaged in the physical activity. The media guidance application's determination may take many forms that will be described below.

In some embodiments, the media guidance application may log, in the profile, what applications the user uses when engaged in physical activity. As used herein, the term "use" is defined to mean the user opening said application at least one time per physical activity session. The media guidance application may retrieve the log of application uses and determine which applications are routinely used. The media guidance application may make the determination of which applications are routinely used by determining the percentage of time an application is used when the user is engaged in physical activity. The media guidance application may compare this percentage with a threshold percentage (e.g., 75%), which may be found in the user profile. If the media guidance application determines that the percentage of time the application is used during physical activity is higher than the threshold percentage, then the application may be routinely used. For example, if the user uses application 104, such as the musicstreaming application Spotify, 95% of the time when the user jogs, and the user-defined threshold is 70%, the media guidance application may determine that Spotify is an application the user routinely uses.

The media guidance may also log, in the profile, what applications the user is using at various times. The media guidance application may retrieve the logged data of application use at all times and compare the timestamps of application use with the timestamps of the physical exercise session. The media guidance application may compare the two sets of timestamps and determine which applications are in the overlap. From here, the process continues as described in the previous paragraph.

For example, the media guidance application may log the use of application 104 while the user is jogging. The media guidance application may then determine that the percentage of the time the user uses application 104 when the user is jogging is within the user-defined range (e.g., 70% or higher). In response to determining that the user routinely uses application 104 while the user is jogging, the media guidance application may deny an output request from application 106. This may be because the user consistently uses application 104 while jogging, and thus is more likely to feel a loss of enjoyment when that consistent use is interrupted. On the other hand, if, while jogging, the user does not routinely use application 104, the media guidance application may authorize the request to output media from application 106.

In some embodiments, when the media guidance application is denying application 106's request to output media, and continues to provide the output of application 104 to the user, the media guidance application may determine, from the information, a level of preference of the user for the application 104 and a level of preference of the user for application 106 (e.g., preference may be determined based on how frequently each application is used). The media guidance application's determination for the user's level of preference may take many forms that will be described below.

One way the media guidance application may determine the level of preference is based on a user-defined hierarchy. The media guidance application may generate prompt 108 that asks the user to rank the applications on user equipment 100 (e.g., "Do you prefer Spotify or Skype?"). The media guidance application may then determine the user's preference based on the user input (e.g., the user selecting Spotify).

Another way the media guidance application may determine the level of preference is based on the information found in the user profile (e.g., type of exercise, the time of day, the user's schedule, or any other similar factors).

For example, the media guidance application may determine the level of preference based on the "type of exercise" data found in the user profile. The media guidance application may look at the frequency of use of an application when the user is engaged in a certain type of exercise. The media guidance application may give applications a high preference if they have a high frequency of use. For instance, the media guidance application may determine, based on the "type of exercise" data found in the user profile, that the user prefers an audio application to a video application when biking outside, but prefers the video application to the audio application when jogging on the treadmill. The media guidance application may make this determination by analyzing from the "type of exercise" data that the user uses the audio application more frequently than the video application when the user is biking, and the user uses the video application more frequently than the audio application when the user is jogging on the treadmill.

As another example, the media guidance application may determine the level of preference based on the "time of day" data found in the user profile. The media guidance application may determine which applications are used more frequently (e.g., indicative of a higher preference) at certain times of the day (e.g., a certain application is used more frequently in the morning than at night). For instance, the media guidance application may determine that the user prefers to listen to an audio application when exercising in the morning, but prefers to use a flashlight application when exercising at night. The media guidance application may make this determination by detecting from the "time of day" data that the audio application is used on average 15 times every morning and three times every night, while the flashlight application is used on average one time in the morning and seven times every night.

As another example, the media guidance application may determine the level of preference based on the "user's schedule" data found in the user profile. The media guidance application may determine the level of preference by analyzing the user's calendar entries. For example, if the media guidance application determines that the user is on a jog during a scheduled workday, the media guidance may set work-related applications (e.g., email applications, voice call applications, SMS messaging applications, or something similar) to have a higher preference than media applications (e.g., music streaming applications, video streaming application, social media applications, or something similar).

The media guidance application may compare the level of preference of the user for the first application to the level of preference of the user for the second application, and may determine whether the level of preference of the user for the first application exceeds the level of preference of the user for the second application.

For example, if the media guidance application determines that the level of preference is based on how frequently each application is used every day, and the user uses application 104 (e.g., a music application) more frequently than application 106 (e.g., an SMS messaging application), then the media guidance application may determine that the music application has a higher level of preference than the SMS messaging application.

As another example, the media guidance application may determine that the level of preference is based on the user's schedule. The media guidance application may determine that application 106 (e.g., an SMS messaging application) has a higher preference than application 104 (e.g., a music streaming application) during the user's working hours.

In response to determining that the level of preference of the user for application 104 exceeds the level of preference of the user for application 106, the media guidance application may deny application 106's request for output, and may continue to provide the output of application 104 to the user. The media guidance application may deny the request using any of the previously discussed methods. In response to determining that the user's level of preference for application 104 does not exceed the user's level of preference for application 106, the media guidance application may allow the request, end providing the output of application 104, and begin providing the output of application 106 to the user.

For example, when the user is listening to an audio output from application 104 (e.g., a music application) while going for a jog, the media guidance application may determine, based on a "type of exercise" preference determination, that the user prefers listening to audio rather than receiving output from application 106 (e.g., SMS message audio notifications) when jogging. The media guidance application may deny any output from application 106 while the user is listening to audio from application 104 while jogging.

In some embodiments, when the media guidance application is denying the request, and continuing to provide the output of application 104 to the user, the media guidance application may determine a level of preference of the user for the physical activity, and may determine a level of preference of the user for the output of application 106. The media guidance application may determine a level of preference of the user for the output of application 106 based on the embodiments described above. The media guidance application may determine a level of preference of the user for the physical activity based on information in the user profile (e.g., frequency of same type of physical activity, time spent engaging in same type of physical activity per week, or similar information).

For example, the media guidance application may determine the level of preference of the user for the physical activity by analyzing the "frequency of the same type of physical activity" data in the user profile. The media guidance application may determine that a higher frequency results in a higher preference. For instance, the media guidance application may determine that the user profile indicates the user loves running and dislikes talking on the phone. The media guidance application may determine that the user loves running by retrieving the logged physical activity data and determining that running is the most frequent type of exercise that the user does. The media guidance application may determine that the user dislikes talking on the phone by logging data in the user profile-related phone call denials and determining that the user almost always declines phone calls. The media guidance application may compare the level of preference of the user for the physical activity to the level of preference of the user for the output of application 106, and may determine whether the level of preference of the user for the physical activity exceeds the level of preference of the user for the output of application 106.

In response to determining that the level of preference of the user for the physical activity exceeds the level of preference of the user for the output of application 106, the media guidance application may deny the request, as described above, and continue to provide the output of application 104 to the user. In response to determining that the level of preference of the user for the physical activity does not exceed the level of preference of the user for the output of application 106, the media guidance application may allow the request, end the generating of the output of application 104, and provide the output of application 106 to the user.

For example, if the user is jogging, the media guidance application may determine that the user's level of preference for jogging exceeds the level of preference for application 106, an SMS messaging application. The media guidance application may determine these preferences by detecting, from information in the user profile, that the user rarely uses the SMS messaging application when jogging. The media guidance application may then deny any application 106 output. On the other hand, if the media guidance application determines that the user often uses application 106 and dislikes jogging (e.g., the user jogs once a year), then the media guidance application may provide output for application 106 when the user is jogging.

In some embodiments, the media guidance application, further in response to determining that the physical activity is routine, may monitor, using the sensor, for a break in the physical activity (e.g., the user pauses the jog to take a break). The media guidance application may detect, during the monitoring, the break in the physical activity (e.g., a GPS sensor indicates that the user is no longer moving). The term "break" and its variants as used herein is defined as a disruption in the continuity of a physical activity session.

The media guidance application may detect a break in physical activity by retrieving data from the stored sensor measurements in the user profile. The media guidance application may analyze the data for disruptions in the continuity of the measurements. The media guidance application may determine that these disruptions are indicative of a break (e.g., the disruption lasts longer than a few seconds).

For example, the media guidance application may determine from the heart rate sensor's measurements that the user's heart rate has dropped below the user's exercising heart rate range. The media guidance application may determine that, after a set amount of time (e.g., 30 seconds) of the user's heart rate being below the range, the user is on a break.

As another example, the media guidance application may detect a break in physical activity by retrieving data from the accelerometer sensor's measurements in the user profile. For instance, the media guidance application may determine from the accelerometer's speed measurements that the user's speed has dropped below the user's exercising speed range, which may be indicative of the user taking a break.

In response to detecting the break in the physical activity, the media guidance application may pause the output of application 104 to the user and may provide the output of application 106. For example, the media guidance application may determine that the user has taken a break from the user's jog because a GPS sensor's measurements have indicated that the user has stopped moving. The media guidance application may then pause the output of application 104, a music streaming application, to provide the output of application 106, an SMS message audio notification.

In some embodiments, the media guidance application may monitor, using the sensor, for an end to the break in the physical activity. The media guidance application may detect, during the monitoring for the end to the break in the physical activity, that the user has resumed performance of the physical activity (e.g., the GPS again indicates movement).

The media guidance application may detect an end to the break in physical activity by retrieving data from the stored sensor measurements in the user profile. The media guidance application may analyze the measurement data for an end to the disruptions in the continuity of the measurements.

For example, the media guidance application may detect that the user has resumed performance of the physical activity by detecting, from heart rate sensor measurements stored in the user profile, that the user's heart rate is once again within the boundaries of the user's exercising heart rate range.

As another example, the media guidance application may determine that the user has resumed performance of the physical activity by detecting, from the accelerometer sensor measurements stored in the user profile, that the user's speed is once again within the boundaries of the user's exercising speed range.

In response to detecting that the user has resumed performance of the physical activity, the media guidance application may discontinue providing the output of application 106 (e.g., end a phone call or close a text message), and may resume providing the output of application 104 (e.g., resume playback of the song).

For example, the media guidance application may detect the user taking a break from the user's jog, by determining from the heart rate sensor's measurements that the user's heart rate is below the user's exercising heart rate range. During the break, the media guidance application may receive a request to output output from application 106 (e.g., a phone call). The media guidance application may allow the output of the phone call from application 106, and pause the output of application 104. The media guidance application may detect, after the user resumes the user's jog, that the user has resumed jogging. The media guidance application may make this detection by determining from the heart rate sensor's measurements that the user's heart rate is within the user's exercising heart rate range. After determining that the break is over, the media guidance application may end the phone call output from application 106 and resume the output of application 104.

In some embodiments, the media guidance application, further in response to determining that the physical activity is routine, may determine, from the information, a plurality of additional users with whom the user is connected (e.g., friends on a social media platform like Facebook). The user profile may store the user's phone and email contact list, the user's Linkedin connections, the user's followers on Twitter, and similar information. The media guidance application may determine the additional users by compiling, from the stored information, a list of the user's connections.

The media guidance application may retrieve, from a social media database, information about each of the additional users (e.g., the user's preferences). The media guidance application may determine, based on the information about each of the additional users, that an additional user also routinely performs the physical activity. The media guidance application may make this determination based on the same embodiments as described above. In response to determining that the additional user also routinely performs the physical activity, the media guidance application may notify the user that the additional user shares an interest in the physical activity. For example, the media guidance application may notify the user using prompt 108, which may state, "Beatrix Kiddo, your follower on Twitter, also enjoys practicing martial arts."

As another example, the user may be a jogger. The media guidance application may retrieve information about the user's friends on a social media platform, such as Facebook. The media guidance application may determine which, if any, of the user's friends also routinely jog. The media guidance application may find that Juliet, one of the user's friends on Facebook, routinely jogs. The media guidance application may make this determination by finding that Juliet routinely (e.g., two or three times a week) posts Facebook statuses about jogging. The media guidance application may notify the user that Juliet shares an interest in jogging. The media guidance application may notify the user via prompt 108, which may say "Juliet, one of your friends on Facebook, also enjoys jogging."

In some embodiments, the media guidance application may determine attributes of the physical activity (e.g., jogging), and may determine attributes of the first output (e.g., music). The media guidance application may determine the physical activity attributes from the information in the user profile, and store these attributes in the information. For example, the media guidance application may retrieve the physical activity data from the user profile, and determine, based on this data, the type of exercise, the length the exercise session, the average heartbeat during the exercise session, and any other similar attributes.

The media guidance application may query the database for entries comprising both the attributes of the physical activity and the attributes of application 104's output, and may retrieve, based on the querying, an entry of the entries comprising both the attributes of the physical activity and the attributes of application 104's output. For example, application 104 may be a music application, and the retrieved entry after querying the database may indicate a playlist of music that is well suited for jogging. One way the media guidance application may determine this indication is by finding a playlist's total time that matches the user's average jog time. The media guidance application may prompt the user with information relating to the entry (e.g., that the playlist be used to consume music using the music application). The prompt, such as prompt 108, may say "This Spotify playlist may be great for your next jog!".

As another example, application 104 may be a music application, and the media guidance application may determine, based on the information in the user profile, the average pace of the user's jog, and the beat of the user's music. The media guidance application may retrieve after querying the database a playlist of songs that match the beat of the songs to the user's pace. The media guidance application may then prompt the user with this playlist. The prompt, such as prompt 108, may say "This Spotify playlist will be incredible for your next jog!".

As yet another example, application 104 may be a video application, and the media guidance application may determine, from the physical activity data in the user profile, the average length of time the user jogs on the treadmill. The media guidance application may retrieve after querying the database a list of television show episodes that are the same length of time as the user's average jog time from a video streaming application, such as Netflix. The media guidance application may then prompt the user with this list. The prompt, such as prompt 108, may say "One of these episodes might be perfect for your next jog!".

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
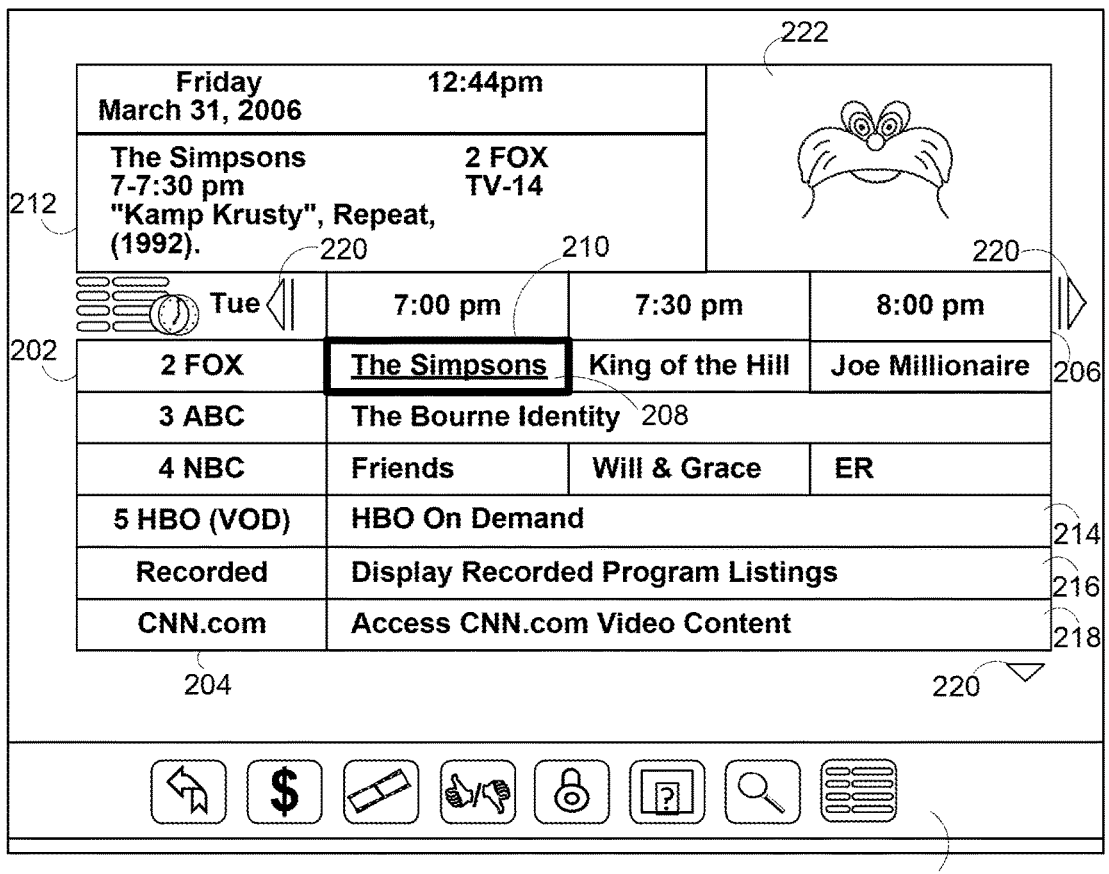
FIG. 2 shows an illustrative embodiment of a display screen that may be used to provide media guidance application listings and other media guidance information, in accordance with some embodiments of the disclosure.
Figure 3:
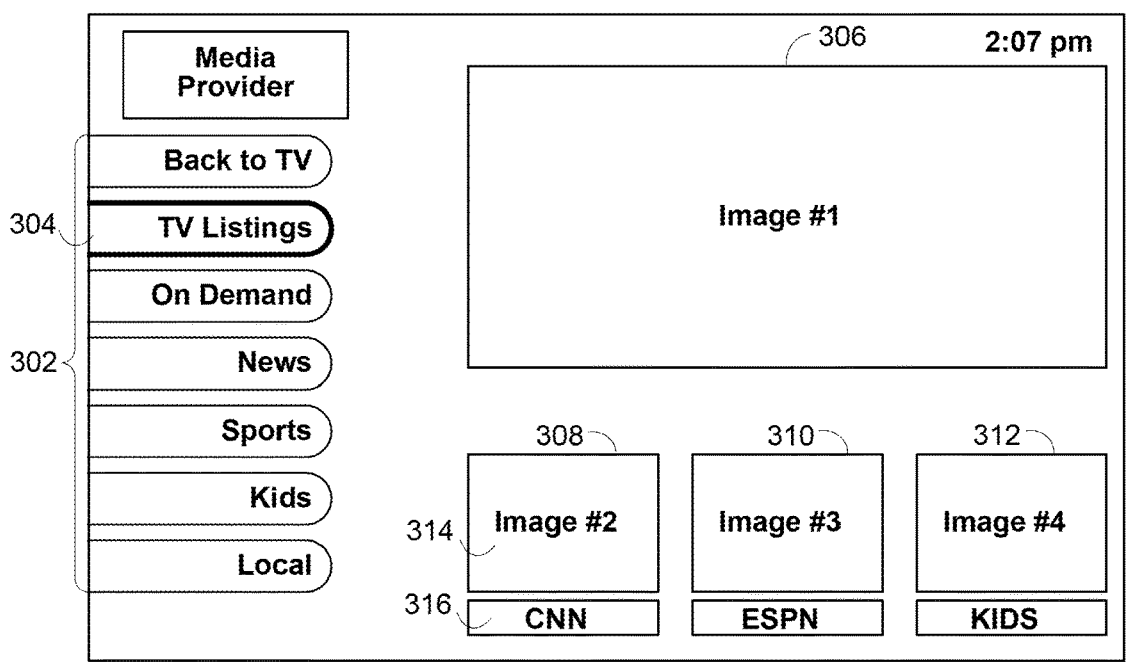
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display.

Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application.

Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
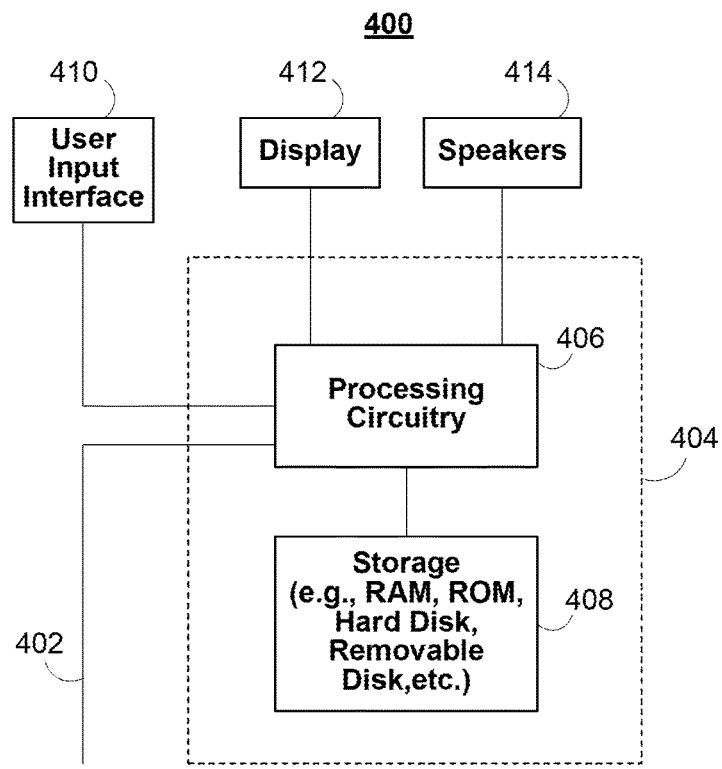
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
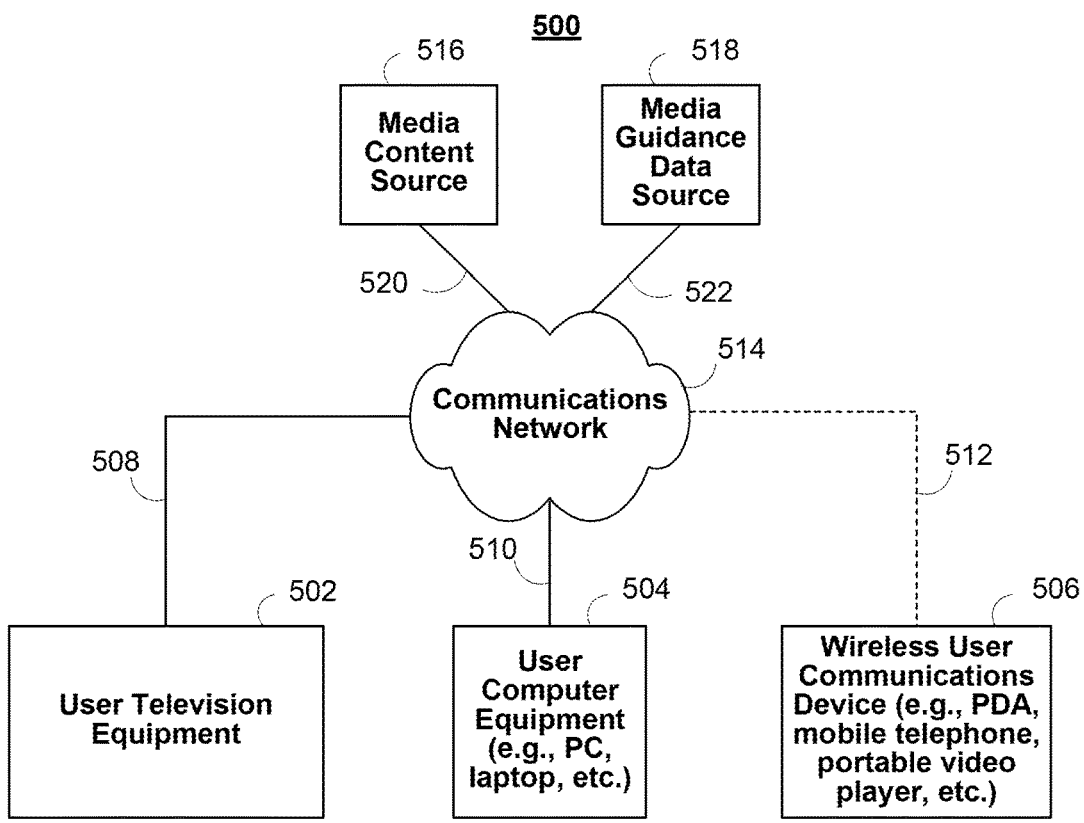
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network.

As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
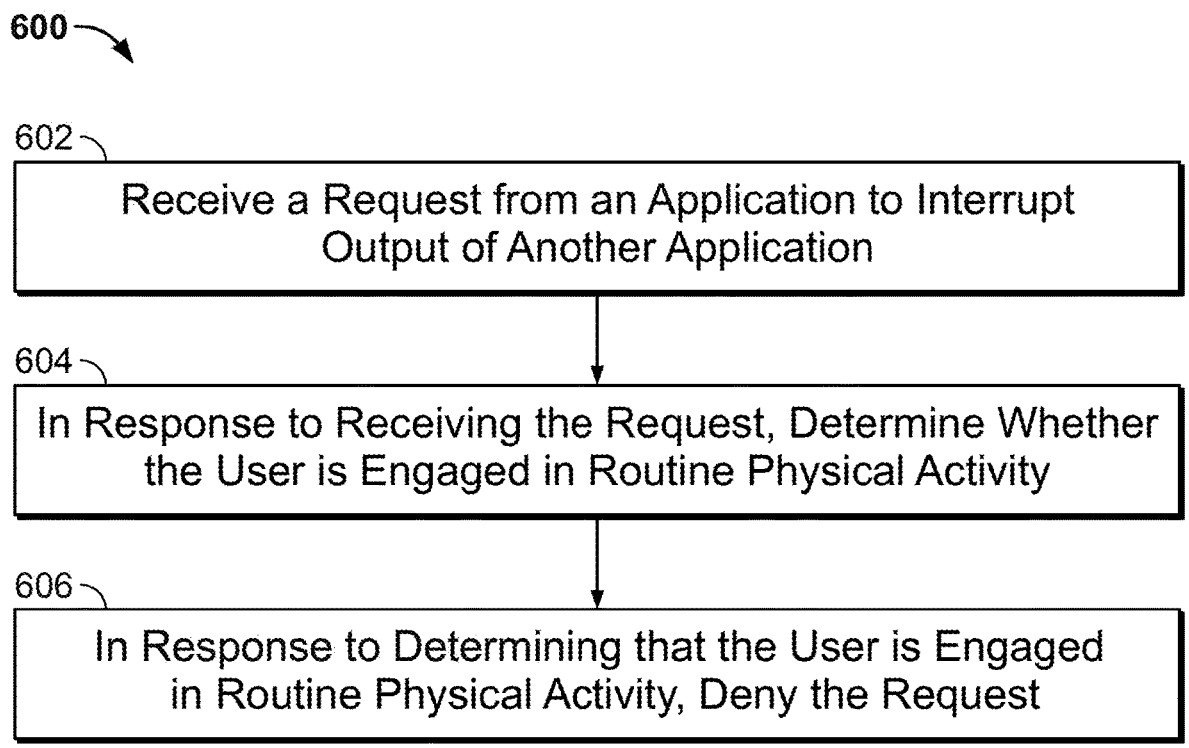
FIG. 6 depicts an illustrative flowchart of a process for denying a request from an application to interrupt output of another application in response to determining that the user is engaged in routine physical activity, in accordance with some embodiments of the disclosure.

FIG. 6 depicts an illustrative flowchart of a process for denying a request from an application to interrupt output of another application in response to determining that the user is engaged in routine physical activity. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communications network 514.

Process 600 begins at 602, where control circuitry 404 receives a request from an application (e.g., application 106) to interrupt output of another application (e.g., application 104). The request may be received by control circuitry 404 by way of communications network 514. Both applications (e.g., application 104 and application 106) may receive output from media content source 516. The output of application 106 may also be prompt 108, which may potentially include data from media guidance source data 518. Both applications may be found in storage 408 of user equipment 100.

At 604, control circuitry 404 determines, in response to receiving the request, whether the user is engaged in routine physical activity. For example, control circuitry 404 may process data from various types of sensors to determine if the user engaged in routine physical activity. The sensors may receive user input by way of user input interface 410.

At 606, control circuitry 404 denies the request, in response to determining that the user is engaged in routine physical activity. Control circuitry 404 denies the request in the same manner described above with respect to FIG. 1. For example, if application 106 requests to interrupt the output of application 104, control circuitry 404 would determine that the user is engaged in routine physical activity and would outright deny the request. Speakers 414 would have no interruption in application 104's output during this entire process. As another example, if an SMS messaging application requests to interrupt a video streaming application, control circuitry 404 would determine that the user is engaged in routine physical activity and deny the request by way of delay. Display 412 and speakers 414 output would be unchanged until control circuitry 404 allows the interruption and requested output.

Figure 7:
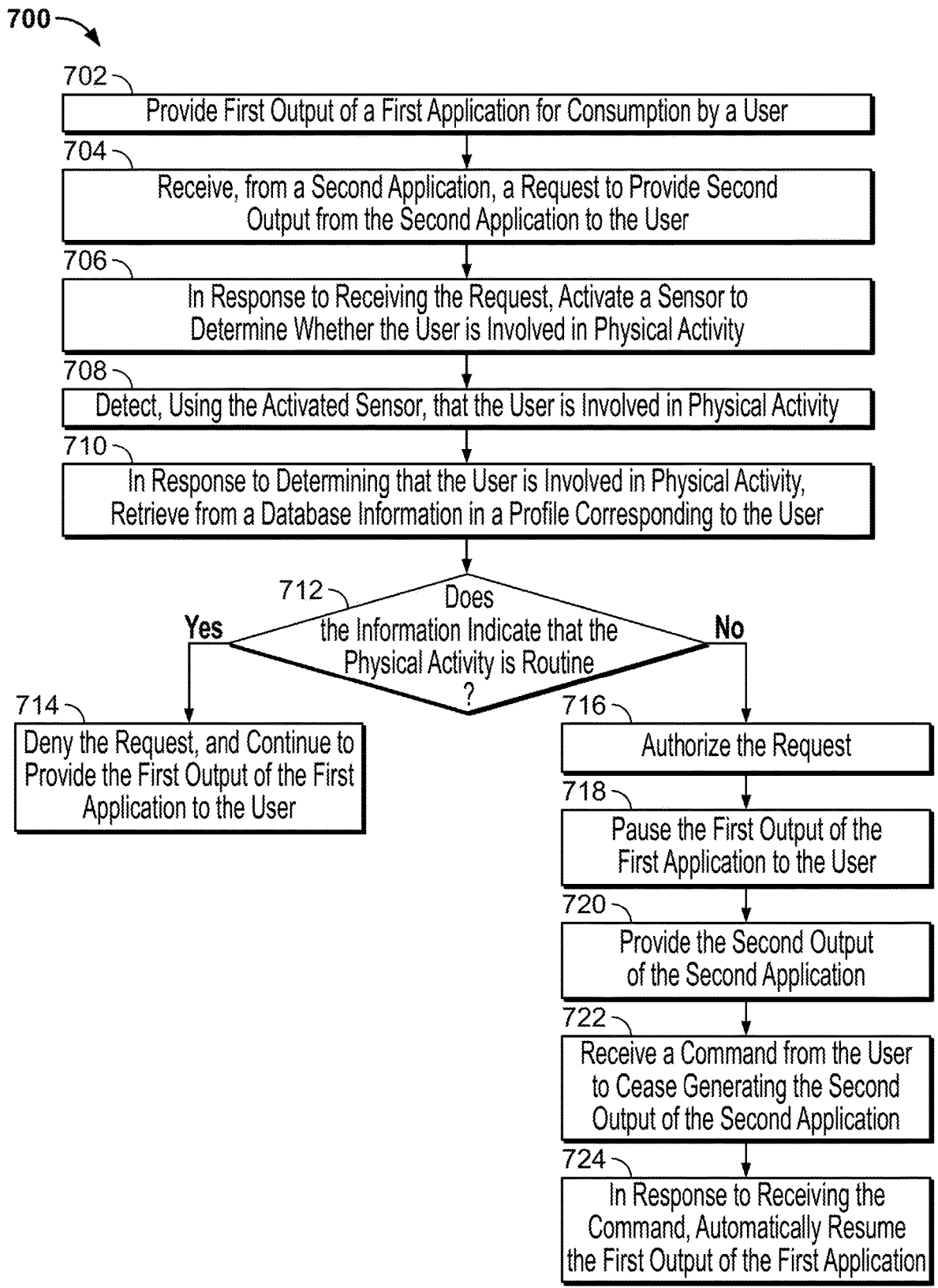
FIG. 7 depicts an illustrative flowchart of a process for determining whether to authorize output of a first application to be interrupted by output of a second application, in accordance with some embodiments of the disclosure.

FIG. 7 depicts an illustrative flowchart of a process for determining whether to authorize output of a first application to be interrupted by output of a second application. Process 700 begins at 702, where a first output of a first application is provided for consumption by the user. The first output can be provided from media content source 516 from an application stored in storage 408 of user equipment 100.

At 704, control circuitry 404 receives, from a second application, a request to provide a second output from the second application to the user. The second application may be stored in storage 408 of user equipment 100. For example, if the second application is an SMS messaging application, it may send a request to control circuitry 404 to alert the user about an incoming message over communications network 514.

At 706, in response to receiving the request, control circuitry 404 may activate a sensor to determine whether the user is involved in physical activity. Control circuitry 404 activates the sensor locally or over communications network 514, if the sensor has to be remotely accessed. The sensor might be a heart rate monitor, accelerometer, GPS, or any other sensor capable of determining if the user is involved in physical activity. At 708, control circuitry 404 detects, using the activated sensor, that the user is involved in physical activity. Control circuitry 404 detects that the user is involved in physical activity by processing data from the sensor using processing circuitry 406. Control circuitry 404 determines physical activity from the processed data in the same manner described above with respect to FIG. 1.

At 710, in response to determining that the user is involved in physical activity, control circuitry 404 retrieves from a database information in a profile corresponding to the user. The database may be stored on any one or combination of storage drives in 408. The database's content may be from media content source 516, and the database's metadata may be from media guidance data source 518. The database may be accessed by way of communications network 514. The information in the profile may include any type of information. At 712, control circuitry 404 determines whether the information in the profile indicates if the physical activity is routine.

If, at 712, control circuitry 404 determines that "Yes," the information indicates that the physical activity is routine, then process 712 continues to 714. At 714, control circuitry 404 denies the request, and continues to provide the first output of the first application to the user. For example, if the user is participating in routine physical activity and listening to a song via a music streaming application through speakers 414, control circuitry 404 may deny the request of an audio notification for an incoming phone call and continue playback of the song.

If, at 712, control circuitry 404 determines that "No," the information does not indicate that the physical activity is routine, then the process continues to 716. At 716, control circuitry 404 authorizes the request. At 718, control circuitry 404 pauses the first output of the first application to the user, and at 720, control circuitry 404 provides the second output of the second application.

At 722, control circuitry 404 receives a command from the user to cease providing the second output of the second application. The user may send a command to control circuitry 404 through user input interface 410. For example, the user command may take the form of exiting out of the second application, indicating that the user wants to resume output of the first application, or any other method of sending a command. At 724, in response to receiving the command, control circuitry 404 automatically resumes the first output of the first application.

For example, control circuitry 404 determines that the user, who is streaming music on a music streaming application with content provided by media content source 516, is not participating in routine physical activity. The SMS messaging application may send a request to control circuitry 404 to provide an audio notification alert for a new SMS message. Based on the above determination, control circuitry 404 will pause playback of the song and provide an audio notification alert for the SMS message. After the user is finished with the SMS message, the user will send a command to control circuitry 404, (e.g., could click "EXIT" from the SMS messaging application) and control circuitry 404 will resume playback of the song.

Figure 8:
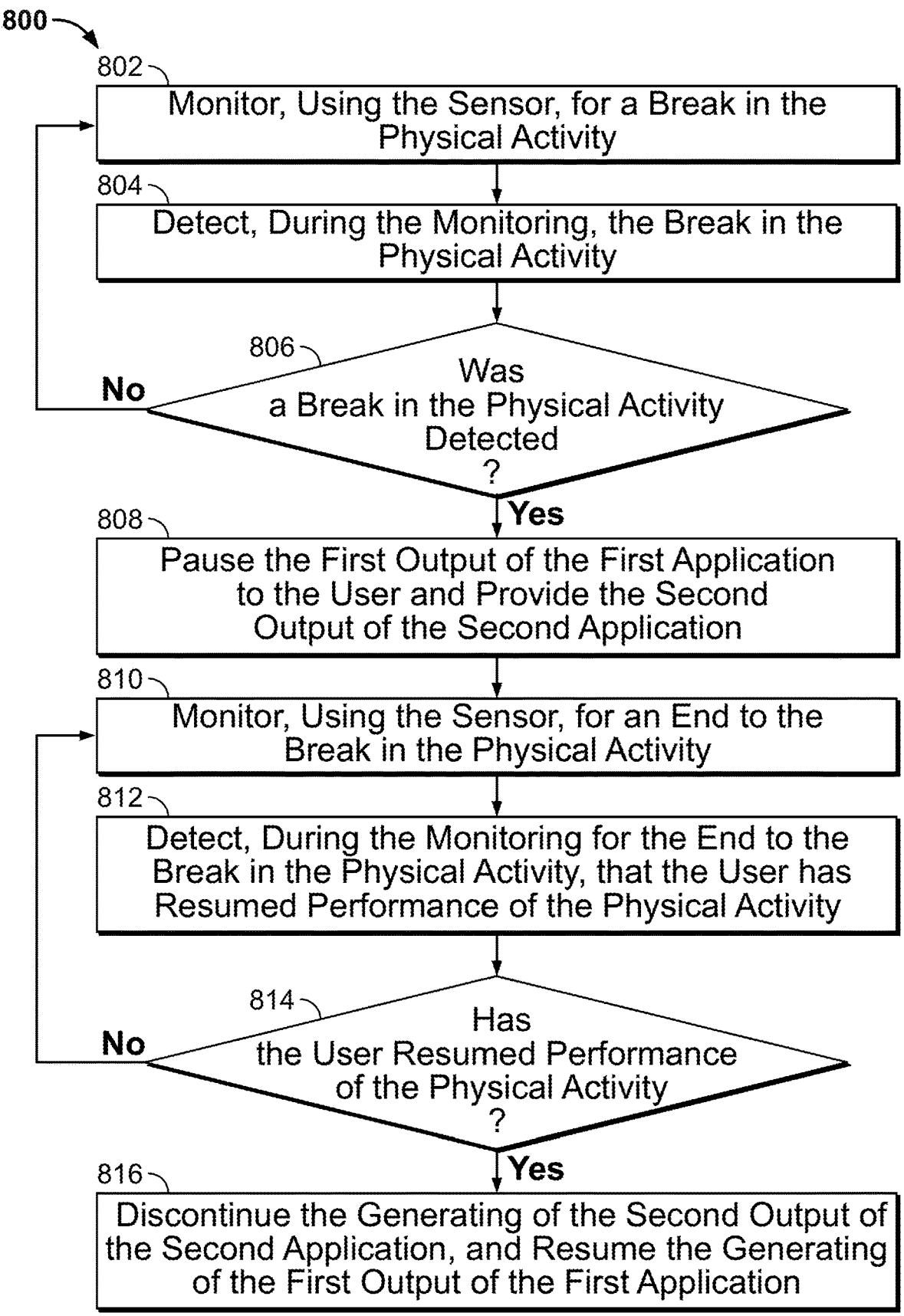
FIG. 8 depicts an illustrative flowchart of a process for monitoring for a break in the physical activity to determine whether to authorize output of a first application to be interrupted by output of a second application, in accordance with some embodiments of the disclosure.

FIG. 8 depicts an illustrative flowchart of a process for monitoring for a break in the physical activity to determine whether to authorize output of a first application to be interrupted by output of a second application. Process 800 begins at 802, where control circuitry 404 monitors, using a sensor, for a break in the physical activity.

At 804, control circuitry 404 detects, during the monitoring, a break in physical activity. A break in physical activity may be detected in the same manner described above with respect to FIG. 1. For example, control circuitry 404 may determine from the GPS sensor data that the user has stopped moving. The sensor data may be input by the user through the user input interface 410. As another example, control circuitry 404 may determine from the heart rate sensor data that the user's heart rate is below the user's exercising heart rate range.

At 806, control circuitry 404 determines if a break in physical activity was detected. If a break in physical activity was not detected by control circuitry 404, process 806 reverts to 802. If a break in physical activity was detected by control circuitry 404, process 806 continues to 808.

At 808, control circuitry 404 pauses the first output of the first application to the user and provides the second application. For example, if the user is listening to music via a music streaming application and takes a break from the user's jog, control circuitry 404 would detect this break. Control circuitry 404 detects breaks in the same manner described above with respect to FIG. 1. While on said break, if an SMS messaging application requests to provide an audio notification alert for an incoming SMS message over communications network 514, control circuitry 404 would pause the song being played over the speakers 414 by the music streaming application to allow the SMS message audio notification to be played over speakers 414.

At 810, control circuitry 404 monitors, using the sensor, for an end to the break in physical activity. At 812, control circuitry 404 detects, during the monitoring for the end to the break in the physical activity, that the user has resumed performance of the physical activity. The end to a break in physical activity can be detected in numerous ways, as previously discussed above. For example, control circuitry 404 may determine from the GPS sensor data that the user has resumed moving. As another example, control circuitry 404 may determine from the heart rate sensor data that the user's heart rate is within the user's exercising heart rate range.

At 814, control circuitry 404 determines if the user has resumed performance of the physical activity. If the user has not resumed performance of the physical activity, process 814 reverts to 810. If the user has resumed performance of the physical activity, process 814 continues to 816. At 816, control circuitry 404 discontinues the generating of the second output of the second application, and resumes the generating of the first output of the first application.

For example, a user, who is listening to music via a music streaming application, takes a break from the user's jog. The user then gets a phone call while on the user's break. Control circuitry 404 pauses playback of the user's music to switch to the phone call. When the user resumes jogging, the control circuitry 404 may end the phone call to resume playback of the song that the user was streaming prior to the phone call.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   determining, for a time period, a number of times when one of a user's historical instances of physical activity occurred simultaneously with one of a user's historical instances of using an application;
   determining a ratio of (a) the number of times when one of the user's historical instances of physical activity occurred simultaneously with one of the user's historical instances of using the application to (b) a total number of the user's historical instances of physical activity during the time period;
   determining, based on the ratio, that usage of the application is routine during physical activity of the user;
   receiving, from the first application, a request to provide an output to a user interface;
   determining, based on data received from a sensor, that the user is involved in a current physical activity;
   based on determining that the user is involved in the current physical activity;
   and based on the determining that the usage of the application is routine during physical activity of the user, authorizing the request and providing the output to the user interface; and
   based on determining that the user is involved in the current physical activity and based on the determining that the usage of the application is not routine during physical activity of the user, denying the request.

2. The method of claim 1, further comprising, based on determining that the usage of the application while the user is also engaged in the physical activity is routine:
   authorizing the request;
   generating, for output at the user interface, the output of the application;
   receiving a command from the user to cease generating the output of the application; and
   based on receiving the command, discontinuing generation of the output of the application.

3. The method of claim 1, further comprising, based on determining that the usage of the application while the user is also engaged in physical activity is not routine:
   prompting the user to input whether the user prefers to consume the output of the application;
   based on receiving input from the user that the user prefers to consume the output of the application, generating the output of the application to the user interface; and
   based on receiving input from the user that the user prefers not to consume the output of the application, denying the request.

4. The method of claim 1, wherein denying the request comprises:
   determining a level of preference of the user for the application;
   determining whether the level of preference of the user for the application exceeds a threshold level of preference;
   based on determining that the level of preference of the user for the application exceeds the threshold level of preference, authorizing the request, and providing the output of the application to the user interface; and
   based on determining that the level of preference of the user for the application does not exceed the threshold level of preference, denying the request.

5. The method of claim 1, wherein denying the request comprises:
   determining a level of preference of the user for the physical activity;
   determining a level of preference of the user for the output of the application;
   comparing the level of preference of the user for the physical activity to the level of preference of the user for the output of the application;
   determining whether the level of preference of the user for the physical activity exceeds the level of preference of the user for the output of the application;
   based on determining that the level of preference of the user for the physical activity exceeds the level of preference of the user for the output of the application, denying the request; and
   based on determining that the level of preference of the user for the physical activity does not exceed the level of preference of the user for the output of the application, authorizing the request, and generating the output of the application to the user interface.

6. The method of claim 1, wherein the method further comprises, further based on determining that the usage of the application while the user is also engaged in the physical activity is routine:
   monitoring, using the sensor, for a break in the physical activity;
   detecting, during the monitoring, the break in the physical activity; and
   based on detecting the break in the physical activity, generating for display at the user interface, the output of the application.

7. The method of claim 6, further comprising:
   monitoring, using the sensor, for an end to the break in the physical activity;
   detecting, during the monitoring for the end to the break in the physical activity, that the user has resumed performance of the physical activity; and
   based on detecting that the user has resumed performance of the physical activity, discontinuing the generating of the output of the application.

8. The method of claim 1, wherein the method further comprises, further based on determining that the usage of the application while the user is also engaged in the physical activity is routine:
   determining a plurality of additional users with whom the user is associated;
   retrieving, from a social media database, information related to each additional user of the plurality of additional users;
   determining, based on the information related to each of the plurality of additional users, that an additional user of the plurality of additional users also routinely uses the application during the physical activity; and
   in response to determining that the additional user of the plurality of additional users also routinely uses the application during the physical activity, notifying the user that the additional user shares an interest in the physical activity.

9. The method of claim 1, further comprising:
   determining attributes of the physical activity;
   determining attributes of the output;
   querying a database for entries comprising both the attributes of the physical activity and the attributes of the output;
   retrieving, based on the querying, an entry of the entries comprising both the attributes of the physical activity and the attributes of the output; and
   prompting the user with information relating to the entry.

10. The method of claim 1, wherein determining that the usage of the application is routine during physical activity of the user is further based on user input.

11. A system comprising:
a sensor;
a user interface;
communications circuitry; and
control circuitry configured to:
  determine, for a time period, a number of times when one of a user's historical instances of physical activity occurred simultaneously with one of a user's historical instances of using an application;
  determine, for the time period, a ratio of (a) the number of times when one of the user's historical instances of physical activity occurred simultaneously with one of the user's historical instances of using the application to (b) a total number of the user's historical instances of physical activity during the time period;
  determine, based on the ratio, that usage of the application is routine during physical activity of the user;
  receive, from the application, a request to provide an output to the user interface;
  determine, based on data received from the sensor, that the user is involved in a current physical activity;
  based on determining that the user is involved in the current physical activity;
  and based on the determining that the usage of the application is routine during physical activity of the user, authorize the request and providing the output to the user interface; and
  based on determining that the user is involved in the current physical activity and based on the determining that the usage of the application is not routine during physical activity of the user, deny the request.

12. The system of claim 11, wherein the control circuitry is further configured, based on determining that the usage of the application while the user is also engaged in the physical activity is routine to:
authorize the request;
generate, for output at the user interface, the output of the application;
receive a command from the user to cease generating the output of the application; and
based on receiving the command, discontinue generation of the output of the application. pause the first output of the first application to the user.

13. The system of claim 11, wherein the control circuitry is further configured, based on determining that the usage of the application during physical activity is not routine, to:
prompt the user to input whether the user prefers to consume the output of the application;
based on receiving input from the user that the user prefers to consume the output of the application, generate the output of the application to the user interface; and
based on receiving input from the user that the user prefers not to consume the output of the application, deny the request.

14. The system of claim 11, wherein the control circuitry is further configured, when denying the request to:
determine a level of preference of the user for the first-application;
determine whether the level of preference of the user for the first-application exceeds a threshold level of preference;
based on determining that the level of preference of the user for the application exceeds the threshold level of preference, authorize the request, and provide the output of the application to the user interface; and
based on determining that the level of preference of the user for the application does not exceed the threshold level of preference, deny the request.

15. The system of claim 11, wherein the control circuitry is further configured, when denying the request to:
determine a level of preference of the user for the current physical activity;
determine a level of preference of the user for the output of the application;
compare the level of preference of the user for the physical activity to the level of preference of the user for the output of the application;
determine whether the level of preference of the user for the physical activity exceeds the level of preference of the user for the output of the application;
based on determining that the level of preference of the user for the physical activity exceeds the level of preference of the user for the output of the application, deny the request; and
based on determining that the level of preference of the user for the physical activity does not exceed the level of preference of the user for the output of the application, authorize the request, and provide the output of the application to the user interface.

16. The system of claim 11, wherein the control circuitry is further configured to, further based on determining that the usage of the application while the user is also engaged in physical activity is routine:
monitor, using the sensor, for a break in the current physical activity;
detect, during the monitoring, the break in the current physical activity; and
in response to detecting the break in the current physical activity, provide the output of the application to the user interface.

17. The system of claim 16, wherein the control circuitry is further configured to:
monitor, using the sensor, for an end to the break in the current physical activity;
detect, during the monitoring for the end to the break in the current physical activity, that the user has resumed performance of the current physical activity; and
based on detecting that the user has resumed performance of the current physical activity, discontinue providing the output of the application.

18. The system of claim 11, wherein the control circuitry is further configured to, further in response to determining that the usage of the application while the user is also engaged in the physical activity is routine:
determine a plurality of additional users with whom the user is connected;
retrieve, from a social media database, information related to each additional user of the plurality of additional users;
determine, based on the information related to each of the additional users, that an additional user of the plurality of additional users also routinely uses the application during the current physical activity; and
based on determining that the additional user of the plurality of additional users also routinely uses the application during the current physical activity, notify the user that the additional user shares an interest in the current physical activity.

19. The system of claim 11, wherein the control circuitry is further configured to:
- determine attributes of the current physical activity;
- determine attributes of the output;
- query a database for entries comprising both the attributes of the current physical activity and the attributes of the output;
- retrieve, based on the querying, an entry of the entries comprising both the attributes of the physical activity and the attributes of the output; and
- prompt the user with information relating to the entry.

20. The system of claim 11, wherein determining that the usage of the application is routine during physical activity of the user is further based on user input.

* * * * *

UNITED STATES PATENT AND TRADEMARK OFFICE
CERTIFICATE OF CORRECTION

PATENT NO. : 12,177,518 B2  
APPLICATION NO. : 16/493849  
DATED : December 24, 2024  
INVENTOR(S) : Holmes et al.

Page 1 of 1

It is certified that error appears in the above-identified patent and that said Letters Patent is hereby corrected as shown below:

In the Claims

In Claim 1, Column 39, Line 15, please delete "from the first application" and insert --from the application--

In Claim 12, Column 41, Line 47, please delete "pause the first output of the first application of the user."

In Claim 14, Column 41, Line 63, please delete "first-"

In Claim 14, Column 41, Line 66, please delete "first-aplication" and insert --application--

Signed and Sealed this  
Fifteenth Day of July, 2025

Coke Morgan Stewart  
*Acting Director of the United States Patent and Trademark Office*